(12) United States Patent
Zampetti

(10) Patent No.: US 12,298,414 B2
(45) Date of Patent: May 13, 2025

(54) SCALABLE COMMON VIEW TIME TRANSFER AND RELATED APPARATUSES AND METHODS

(71) Applicant: Microchip Technology Incorporated, Chandler, AZ (US)

(72) Inventor: George Zampetti, Livermore, CA (US)

(73) Assignee: Microchip Technology Incorporated, Chandler, AZ (US)

(*) Notice: Subject to any disclaimer, the term of this patent is extended or adjusted under 35 U.S.C. 154(b) by 5 days.

(21) Appl. No.: 18/511,689

(22) Filed: Nov. 16, 2023

(65) Prior Publication Data

US 2024/0094407 A1 Mar. 21, 2024

Related U.S. Application Data

(63) Continuation of application No. 17/653,987, filed on Mar. 8, 2022, now Pat. No. 11,841,443.
(Continued)

(51) Int. Cl.
*G01S 19/25* (2010.01)
*G01S 19/23* (2010.01)
*G01S 19/39* (2010.01)

(52) U.S. Cl.
CPC ............ *G01S 19/256* (2013.01); *G01S 19/23* (2013.01); *G01S 19/396* (2019.08)

(58) Field of Classification Search
CPC ....... G01S 19/256; G01S 19/396; G01S 19/23
(Continued)

(56) References Cited

U.S. PATENT DOCUMENTS 10,956,369 B1 3/2021 Liu et al.
11,099,276 B2* 8/2021 Lentz ................. G01S 19/37
(Continued)

FOREIGN PATENT DOCUMENTS

CN 102998681 B 9/2015
CN 105116423 B 11/2017
(Continued)

OTHER PUBLICATIONS

International Search Report for International Application No. PCT/US2022/071028, mailed Jun. 15, 2022, 4 pages.
(Continued)

*Primary Examiner* — Harry K Liu
(74) *Attorney, Agent, or Firm* — TraskBritt

(57) ABSTRACT

Common view time transfer and related apparatuses and methods are disclosed. An apparatus includes a receiver oscillator to provide a local clock signal and one or more processors. The one or more processors are to perform, at least partially based on the local clock signal, event time tagging pre-processing at least partially responsive to satellite signals received from one or more satellites to generate a decimated precision correction state estimate; determine, per satellite signal pseudo range residuals; determine a navigation engine clock state; perform a precision clock state pre-processing operation at least partially responsive to the navigation engine clock state and the decimated precision correction state estimate to generate a precision navigation clock state; and generate a common view real time report at least partially responsive to the per satellite signal pseudo range residuals and the precision navigation clock state.

22 Claims, 7 Drawing Sheets

Related U.S. Application Data

(60) Provisional application No. 63/158,238, filed on Mar. 8, 2021.

(58) Field of Classification Search
USPC .......................................................... 342/350
See application file for complete search history.

(56) References Cited

U.S. PATENT DOCUMENTS

| | | | |
|---|---|---|---|
| 11,442,173 B2 * | 9/2022 | Kim | ................. G01S 19/39 |
| 2011/0291881 A1 * | 12/2011 | Shirai | ................. G01S 19/22 |
| | | | 342/357.25 |
| 2015/0338520 A1 | 11/2015 | Boriskin et al. | |
| 2019/0391274 A1 | 12/2019 | Chen et al. | |

FOREIGN PATENT DOCUMENTS

| | | | | |
|---|---|---|---|---|
| CN | 109358487 | A | 2/2019 | |
| CN | 111884748 | A | 11/2020 | |
| EP | 2073403 | A1 | 6/2009 | |
| EP | 3933444 | A1 * | 1/2022 | ........... G01S 19/393 |
| ES | 2308300 | T3 | 12/2008 | |
| JP | 6513179 | B2 * | 5/2019 | .............. G01S 1/00 |
| JP | 2019-134380 | A | 8/2019 | |
| WO | WO-2022031168 | A2 * | 2/2022 | ............. G01S 19/07 |

OTHER PUBLICATIONS

International Written Opinion for International Application No. PCT/US2022/071028, mailed Jun. 15, 2022, 14 pages.

\* cited by examiner

SCALABLE COMMON VIEW TIME TRANSFER AND RELATED APPARATUSES AND METHODS

CROSS-REFERENCE TO RELATED APPLICATION

This application is a continuation of U.S. patent application Ser. No. 17/653,987, filed Mar. 8, 2022, which claims the benefit under 35 U.S.C. § 119(e) of U.S. Provisional Patent Application No. 63/158,238, filed Mar. 8, 2021, and titled "COMMON VIEW TIME TRANSFER FOR MASS MARKET GNSS DEVICES AND RELATED APPARATUSES, SYSTEMS, AND METHODS," the disclosure of each of which is hereby incorporated herein in its entirety by this reference.

TECHNICAL FIELD

This disclosure relates generally to common view time transfer.

BACKGROUND

Evolution of market needs for precise timing in various segments such as wireless, smart cities, and autonomous transport has driven the need to leverage relatively expensive low scalability common view time transfer systems into solutions viable in mass market applications.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
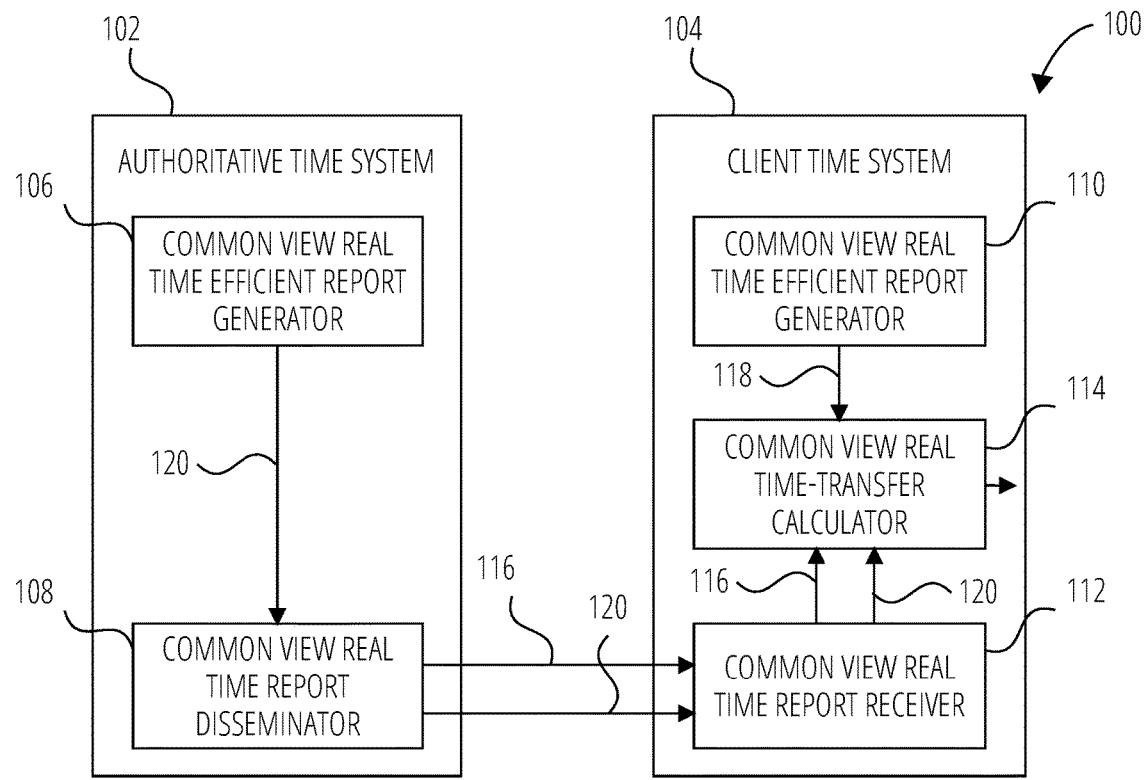
FIG. 1 is a block diagram of a global navigation satellite system (GNSS) system, according to some examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Mass market GNSS involves software that works with mass market GNSS receivers to deliver resilient and precise time services. Common view time transfer systems have historically been satellite based, but terrestrial based approaches are also relevant. For purposes of the disclosure, common view time transfer systems include both traditional common view approaches as well as related approaches such as all-in-view time transfer.

One example of a use case for mass market common view includes timing system products requiring new levels of performance and resiliency. By way of non-limiting example, in the 1980s communication requirements on the order of 125 microsecond timing accuracy were prevalent, in contrast to substantially a thousand times tighter timing accuracy requirements in certain long term evolution (LTE) and fifth generation (5G) applications today. Also, micro position, navigation, and timing (PNT) requirements for centimeter accuracy require sub-nanosecond coherency. In addition, urban deployment requires mitigation of both intentional and unintentional GNSS errors. Furthermore, today there is heightened awareness of GNSS vulnerability (e.g., the United States Space Policy Directive 7, issued Jan. 15, 2021). Another example of a use case for mass market common view includes infrastructure locations such as central offices, data centers, sub-stations, and streetlights.

Common view solves the problem of calibrating asymmetry in precision timing protocol (PTP) networks, and supports coherency used to achieve centimeter PNT. There is currently, however, a lack of cost effective scalable solutions to implement common view calibration. Also, conventional common view relies on specialty high-end GNSS equipment, which is relatively expensive. Another shortcoming of conventional common view is non-scalable centralized communication flow. In addition, conventional common view is not resilient in degraded GNSS environments, and is not real time.

Satellite based common view time transfer uses special GNSS receiver hardware that commands a high price point in the market. With the recent introduction of multiband mass market low cost GNSS receivers in the market, precise common view time transfer for large scale precise timing applications may be improved. Conventional common view time transfer is post-processing heavy and computation based. For mass market common view time transfer, however, a solution that operates in substantially real time without major processor load would be desirable, in contrast to conventional post-processing heavy computation based common view time transfer. Also, conventional common view time transfer uses carefully engineered antenna installations with clear line of sight and protection from RF interference. For mass market common view time transfer, however, it would be desirable to instead use a simple antenna installation (e.g., a patch antenna) installed without concerns regarding line of sight such as in an urban canyon environment.

Navigation engines of GNSS receiver chips may supply a real time solution including a clock state. The clock state is a current estimate of a receiver oscillator time and a frequency state. These may be an estimate of the receiver oscillator's offset from a common GNSS timescale. Alternatively, the clock state may be referenced to a coordinated universal time (UTC) timescale. The reference timescale is common to all navigation engines participating in the time transfer. While the navigation engine performs a significant portion of the computation in real time to obtain the clock state and utilizes it to generate a time output (e.g., a pulse per second (PPS) output with associated time of day information), there are some drawbacks associated with how the navigation engine operates.

First, the solution for the clock state is for a low-cost oscillator associated with the receiver (e.g., a temperature compensated crystal oscillator (TCXO)). In order to have a useful clock state, the clock state should be with respect to a local timing system precision oscillator or timescale. In disciplined oscillator systems there is a single precision oscillator. Other timing systems may generate a precision timescale utilizing more than one oscillator. This precision source is referred to as a precision timescale. Ideally, the GNSS receiver could directly use the precision timescale as the local oscillator input. However, this approach is precluded by the design of mass market GNSS receiver chips. In other words, the clock estimate provided by the navigation engine is for the wrong oscillator, i.e., it is for the low cost receiver oscillator instead of the precision timescale. Second, the navigation engine clock state includes numerous trade-offs that should be assessed over a short window of time with current RF receiver conditions. The clock engine is designed to minimize the pseudo-range errors based on observing the received GNSS signals effectively simultaneously to minimize the impact of the local low-cost oscillator. This is necessitated by the relatively poor performance of this oscillator over time. This constraint for simultaneously reception makes the solution vulnerable to degradations related to current RF conditions such as noise, multipath and reflections.

Disclosed herein are common view time solutions that may leverage the capabilities of conventional mass market GNSS receivers so that precision time transfer may be achieved in real time and in a cost-effective manner. Also, common view time solutions disclosed herein may mitigate the mass market antenna environment. The navigation engine and associated heavy computation that is included in mass market GNSS receivers may be utilized to minimize the additional processing needed to achieve real time common view time transfer. Examples disclosed herein may utilize event time tagging capabilities of mass market receivers to provide a mapping between a receiver clock state and a precision timescale state (e.g., of an authoritative time system). Also, examples disclosed herein may utilize available pseudo-range residual data for each satellite and signal to re-map the clock state to a per satellite, per signal clock state with an efficient process.

Examples disclosed herein may utilize a mass market multiband GNSS receiver in a system (e.g., ublox ZED-F9T module, available from u-blox AG, Thalwil, Switzerland) to support precise common view time transfer at single digit nanosecond accuracy levels. Examples disclosed herein may improve accuracy and resiliency of Precision Time Protocol network based time distribution as GNSS receivers are used in these networks both to source timing and calibrate asymmetry along the network path. The ability to support precise time transfer in GNSS degraded environments such as urban canyons may enable improvements in PNT systems such as smart cities and autonomous transport. Examples disclosed herein may also be applicable to other market segments such as field testing of over the air 5G wireless systems. Implicit in a common view solution is its ability to support global precise time transfer directly from authoritative time sources, which opens opportunities in use cases where there is a need for global wireless portable time transfer.

Rather than directly locking a receiver local oscillator to an external precise timescale or using a precision event time tagging function that are not available on mass market GNSS receivers disclosed examples may use clock modeling to achieve a similar effective function. Also, rather than relying on post processing of raw measurement data to extract per satellite signal common view time error, disclosed examples leverage processing already performed in the GNSS receiver. Furthermore, rather than using a post processing approach where both an implicit latency in real time control and security and availability of the communication path is not considered, disclosed examples may support mass market real time common view applications including efficient, computationally light algorithms that leverage processing already performed in the GNSS receiver (e.g., time tagging). As compared to conventional systems known to the inventor that require a high-end GNSS antenna and a carefully engineered installation to ensure that RF interference and line of sight degradation are rare events, disclosed examples may operate in a GNSS degraded RF environment such as an urban canyon.

FIG. 1 is a block diagram of a GNSS system 100, according to some examples. The GNSS system 100 includes an authoritative time system 102 and a client time system 104. The authoritative time system 102 includes circuitry (e.g., implementing firmware and/or software) for a common view real time efficient report generator 106 and common view real time report disseminator 108. The common view real time efficient report generator 106 may generate a common view real time report 120 and provide the common view real time report 120 to the common view real time report disseminator 108. The common view real time report disseminator 108 may transmit a reduced common view real time report 116 or the common view real time report 120, i.e., a non-reduced common view real time report, to the client time system 104.

The client time system 104 includes circuitry (e.g., implementing firmware and/or software) for a common view real time efficient report generator 110, a common view real time report receiver 112, and common view real time-transfer calculator 114. The common view real time efficient report generator 110 may generate a common view real time report 118 and provide the common view real time report 118 to the common view real time-transfer calculator 114. The common view real time report receiver 112 may receive the reduced common view real time report 116 or the common view real time report 120 from the common view real time report disseminator 108 and provide the reduced common view real time report 116 or the common view real time report 120 to the common view real time-transfer calculator 114.

Certain systems operating as authoritative sources of time (e.g., the authoritative time system 102) and many other systems operating as clients of these sources (e.g., the client time system 104) may be included in the GNSS system 100. One instance each of an authoritative time system 102 and a client time system 104, however, are illustrated in FIG. 1 for simplicity.

Each of the systems (e.g., the authoritative time system 102 and the client time system 104) may generate common view real time reports (e.g., the common view real time report 120 of the authoritative time system 102 and the common view real time report 118 of the client time system 104). The common view real time reports 118, 120 provide estimates of the time error of a precision timescale in that location compared to all satellite signals actively tracked.

The authoritative time systems (e.g., the authoritative time system 102) support a report dissemination function (e.g., the common view real time report disseminator 108), which provides a timely authenticated report, e.g., the reduced common view real time report 116, to the client time systems (e.g., the client time system 104). The client time systems (e.g., the client time system 104) receive the reduced common view real time report 116 and utilize the reduced common view real time report 116 to support either a common view or an all-in-view time transfer calculation process to determine time error.

Figure 2:
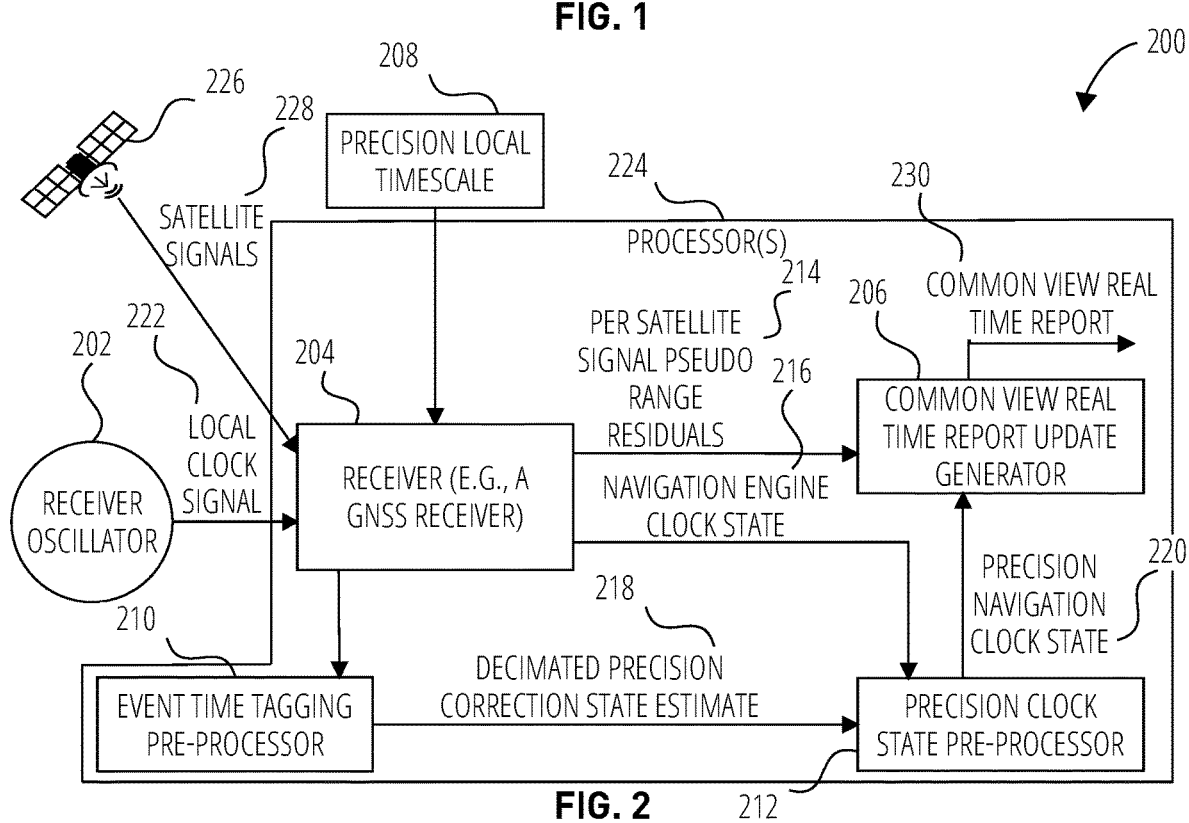
FIG. 2 is a block diagram of an example of a common view real time efficient report generator of the GNSS system of FIG. 1.

FIG. 2 is a block diagram of a common view real time efficient report generator 200, which is an example of each of the common view real time efficient report generator 106 and the common view real time efficient report generator 110 of FIG. 1. The receiver 204 utilizes a low cost, low performance receiver oscillator 202 (e.g., a TCXO) to generate a local clock signal 222, which is delivered as an input to the receiver 204 and may be used as a receiver timescale. In mass market GNSS receivers this local clock signal 222 input is designed to be the only oscillator input and is used for all RF and digital processing. The common view real time efficient report generator 200 provides the apparatus and method to effectively replace the low cost, low performance receiver oscillator as the reference for common view timing measurements with a precision local timescale 208.

Time may be transferred between two precision timescales, specifically an instance of the precision local timescale 208 of the common view real time efficient report generator 106 of the authoritative time system 102 of FIG. 1 and an instance of the precision local timescale 208 of the common view real time efficient report generator 110 of the client time system 104 of FIG. 1. In the case of the precision local timescale 208 of the authoritative time system 102, the precision local timescale may be viewed as autonomous of this time transfer system. In the case of the precision local timescale 208 of the client time system 104, however, the precision local timescale 208 may not strictly speaking be autonomous as it may be influenced by the time transfer system and or other sources. Embodiments disclosed herein may include a process of metrology (measuring) of the time differences.

FIG. 2 also illustrates one or more processors 224 (sometimes referred to herein simply as "processors 224") of common view real time efficient report generator 200 including the receiver 204 (e.g., a mass market GNSS receiver, without limitation). Certain processes may be limited to the receiver 204 as the common view real time efficient report generator may not be designed to support common view time transfer. The receiver oscillator 202 provides the local clock signal 222 to the receiver 204. This local clock signal 222 may not be available to processes outside a GNSS receiver chip or module upon which the common view real time efficient report generator is implemented. The receiver 204 may be constrained to only use the local clock signal 222 to generate the receiver local timescale. Input from the precision local timescale 208 is provided to the receiver 204. Receiver 204 supports event time tagging of the input from the precision local timescale 208, but this input is not useable as an alternative local clock signal. The event time tagging data from the receiver 204 provides data to the event time tagging pre-processor 210, which may be a function performed by processors 224. The raw time tagging data from the receiver 204 may be generated at a rate greater than the rate of generation of the navigation updates from the receiver 204. The output of event time tagging pre-processor 210 may be decimated to align to the navigation update rate of the receiver. The receiver 204 may determine per satellite signal pseudo range residuals 214 and determine a navigation engine clock state 216.

The processors 224 may also comprise a precision clock state pre-processor 212, which may be a function performed by processors 224, the precision clock state pre-processor 212 at least partially responsive to the navigation engine clock state 216 and the decimated precision correction state estimate 218 to generate a precision navigation clock state 220. The processors 224 may comprise a common view real time report update generator 206 at least partially responsive to the per satellite signal pseudo range residuals 214 and the precision navigation clock state 220 to generate a common view real time report 230. The common view real time report update generator 206 determines validity of the per satellite signal pseudo range residuals 214 provided by the receiver (204) and generates an entry for each valid satellite signal 228 (from one or more satellites 226) of the validated time error with respect to the precision local timescale 208. Note that the precision local timescale 208 is not directly observed in the common view real time report update generator 206, but is effectively the reference of the precision navigation clock state 220 processing. The common view real time report 230 may be the common view real time report 120 or the common view real time report 118 of FIG. 1.

The common view real time efficient report generator 200 is structured to work within the constraints of scalable mass market GNSS receivers. Such receivers do not support an external clock input that effectively replaces the local clock signal 222 input, but these receivers may support an event time tagging input. The event time tagging event generated an event time tag for rising and/or falling edges observed on this event time tagging input. The external precision local timescale 208 is provided as a time event input to the receiver 204 and the instantaneous time difference between the local clock signal 222 and the precision timescale may be obtained. If the event time tagging is sufficiently precise then the instantaneous time difference may be used to continuously correct the navigation clock state updates. Unfortunately, although mass market GNSS receivers do support event time tagging, the precision for instantaneous correction is insufficient for this mode of operation. In other words, the resolution of event time tagging in conventional mass market receivers is insufficient.

Single shot event measurement data, however, may be used to generate a precision clock correction state estimate in event time tagging pre-processor 210. The instantaneous measurement may be filtered to obtain precise estimates of a clock model for the local receiver oscillator 202. Such clock modelling will be apparent to those of ordinary skill in the art. For the observation intervals involved, a two-state clock model may be used. The clock modelling implicitly addresses the rate difference between the event time tagging process and the navigation state update rate supported by the GNSS receiver. A corrected clock state of the receiver clock is characterized by the current clock bias and clock drift. A corrected clock bias is the best estimate of the error of the receiver clock with respect to the precision timescale. A corrected clock drift is the best estimate of the clock frequency with respect to the precision timescale. The corrected clock state is thus the precision correction state estimate. In the case where the event time tagging rate is greater than the navigation state update rate, as indicated above, then the reduced amount of precision correction state estimates, is decimated precision correction state estimate 218.

In some examples the common view real time efficient report generator 200 may be performed by an apparatus of an authoritative time system (e.g., the common view real time efficient report generator 106 of the authoritative time system 102 of FIG. 1). In such examples the processors 224 are to perform a real time report dissemination operation (e.g., by the common view real time report disseminator 108 of FIG. 1) to provide the common view real time report 230 to a client time system (e.g., the client time system 104 of FIG. 1). In such examples the common view real time report disseminator may include a common view real time report dissemination reduction processor operation (e.g., the common view real time report dissemination reduction processor 404 of FIG. 4) and a protocol mapper (e.g., the protocol mapper 406 of FIG. 4).

In some examples the common view real time efficient report generator 200 may be implemented by an apparatus of a client time system (e.g., the client time system 104 of FIG. 1). In such examples the processors 224 may perform a common view real time report reception operation (e.g., by the common view real time report receiver 112 of FIG. 1) on an authoritative common view real time report (e.g., the reduced common view real time report 116 or the common view real time report 120 of FIG. 1) received from an authoritative time system (e.g., the authoritative time system 102 of FIG. 1). In such examples, the common view real time report receiver may include a protocol de-mapper (e.g., the protocol de-mapper 502 of FIG. 5).

In some examples the precision clock state pre-processor 212 includes a delay matching decimation filter (e.g., the delay matching decimation filter 602 of FIG. 6) to filter the navigation engine clock state 216. In some such examples the processors 224 may, as part of the precision clock state pre-processor 212, sum the filtered navigation engine clock state with the decimated precision correction state estimate 218 to generate the precision navigation clock state 220.

In some examples the common view real time report update generator 206 includes a plurality of classifiers to detect anomalies relevant to the common view real time report 230.

Figure 3A:
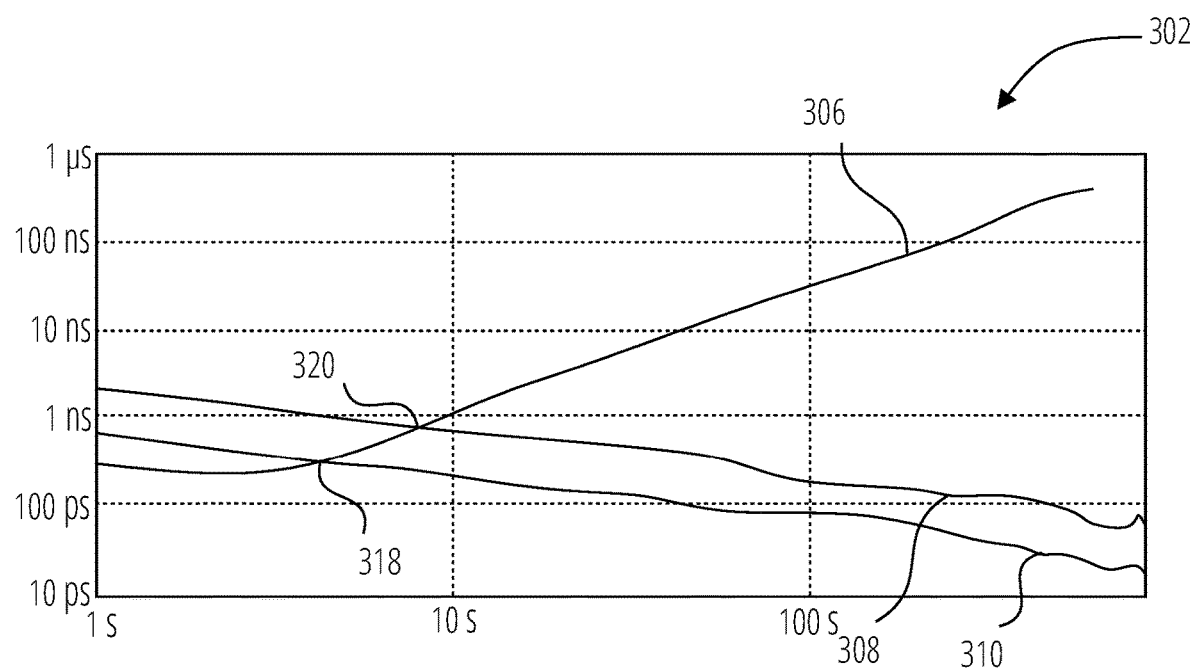
FIG. 3A is a plot illustrating a time stability of an estimation process for a receiver event time tagger, according to some examples.

FIG. 3A is a plot 302 illustrating time stability of an estimation process for a receiver event time tagger, according to some examples. The event time tagger stability includes the local oscillator noise and measurement noise of the time tagger. For the illustration the precision local timescale is assumed to be noiseless. The plot 302 illustrates the tradeoffs in achieving suitable event time stamp stability. The local oscillator stability 306 is shown in relation to the stability of two example time tagging processes. The 1 Hz time tagging quantization noise process 308 is essentially the noise contributed by using an instantaneous process. Also shown is a 10 Hz time tagging event process 310 where the time deviation (TDEV) stability shows the noise improvement with the averaging at the high rate. Intersection points (or crossovers) 318 and 320 illustrate the achievable time measurement stability and the improvements that can be achieved with event time tagging pre-processing.

Figure 3B:
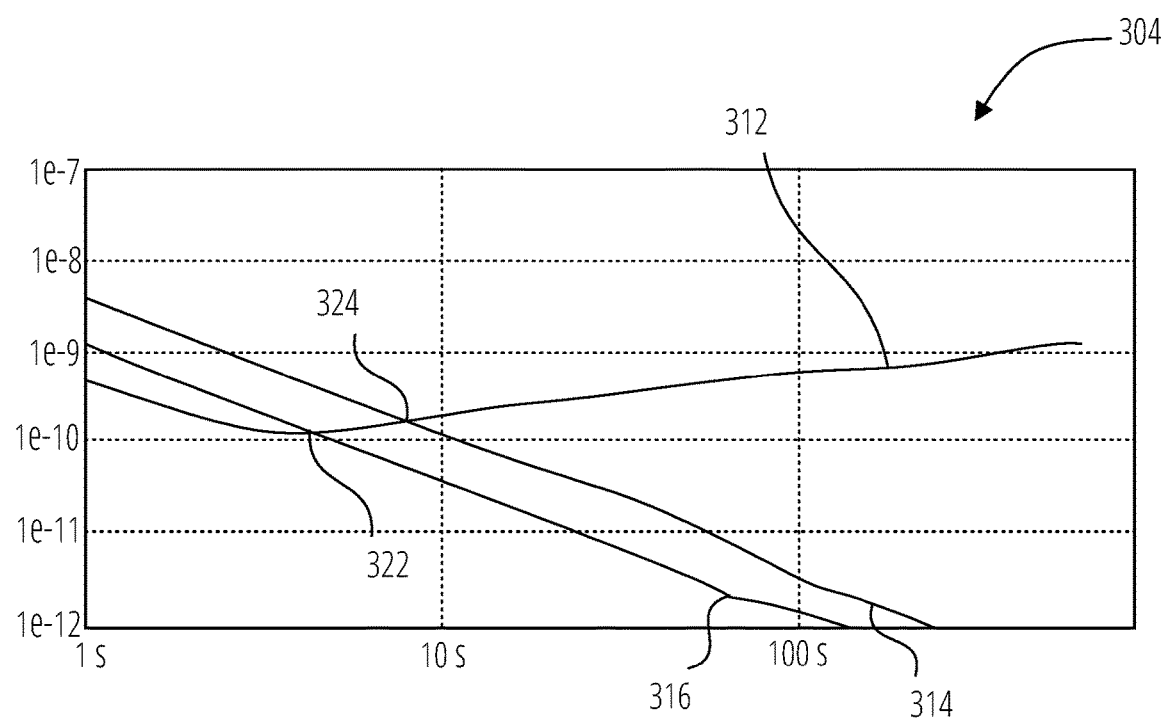
FIG. 3B is a plot illustrating a frequency stability of the estimation process for the receiver event time tagger.

FIG. 3B is a plot 304 illustrating a frequency stability of the estimation process for the receiver event time tagger. The plot 304 illustrates a modified Allan deviation (MDEV) oscillator stability (MDEV oscillator stability 312), a 1 Hz time tagging quantization noise process 314, and a 10 Hz time tagging quantization noise process 316.

Referring to FIG. 3A and FIG. 3B together, the crossovers 318, 320 of the TDEV local oscillator stability 306 with the 1 Hz time tagging quantization noise process 308 and the 10 Hz time tagging event process 310, and the crossovers 322, 324 of the MDEV oscillator stability 312 with the 1 Hz time tagging quantization noise process 314 and the 10 Hz time tagging quantization noise process 316, reflect improved state estimation intervals. The improved estimates are obtained utilizing filtering techniques such as least squares regression or Kalman filtering. For the data plotted in FIG. 3A and FIG. 3B, observed that sub-nanosecond time error residual is achieved at the intersection point for the 10 Hz process (crossover 318 in FIG. 3A and crossover 322 in FIG. 3B). The event time-tagging pre-processing provides processing to filter and, as desired, decimate the output estimate of the required correction, to reference the data reported from the GNSS receiver to the local precision timescale to support common view operation.

The GNSS receiver supports substantial processing that can be re-purposed for the common view application by efficiently remapping from the local oscillator native reference to the precision timescale reference. GNSS receivers use a navigation engine operating in a feedback mode. At each update interval a current position and clock state from the navigation engine are converted to estimates of the current pseudo-range predicted for each satellite signal 228 (FIG. 2) received. The difference between the estimated pseudo-range (from the navigation engine in the receiver) and the measure pseudo-range is a standard output of a GNSS receiver known as the pseudo-range residuals. GNSS receivers that are utilized for stationary timing operation may be configured in a stationary operating mode. Since the operating mode for timing sites is stationary, the position solution is fixed. In stationary operation each pseudo-range residual may be considered as measurement of the time error of the actual common satellite timescale clock with a small residual error in modelling with respect to the current clock state of the navigation engine.

The sum of the current clock state and the pseudo-range residuals provide not just a raw pseudo-range measurement, but also a corrected pseudo-range measurement where known path delay components have already been mitigated by the receiver's processing. The sum of the current clock state plus the pseudo-range residuals is the time error of the local oscillator with respect to satellite time.

Figure 4:
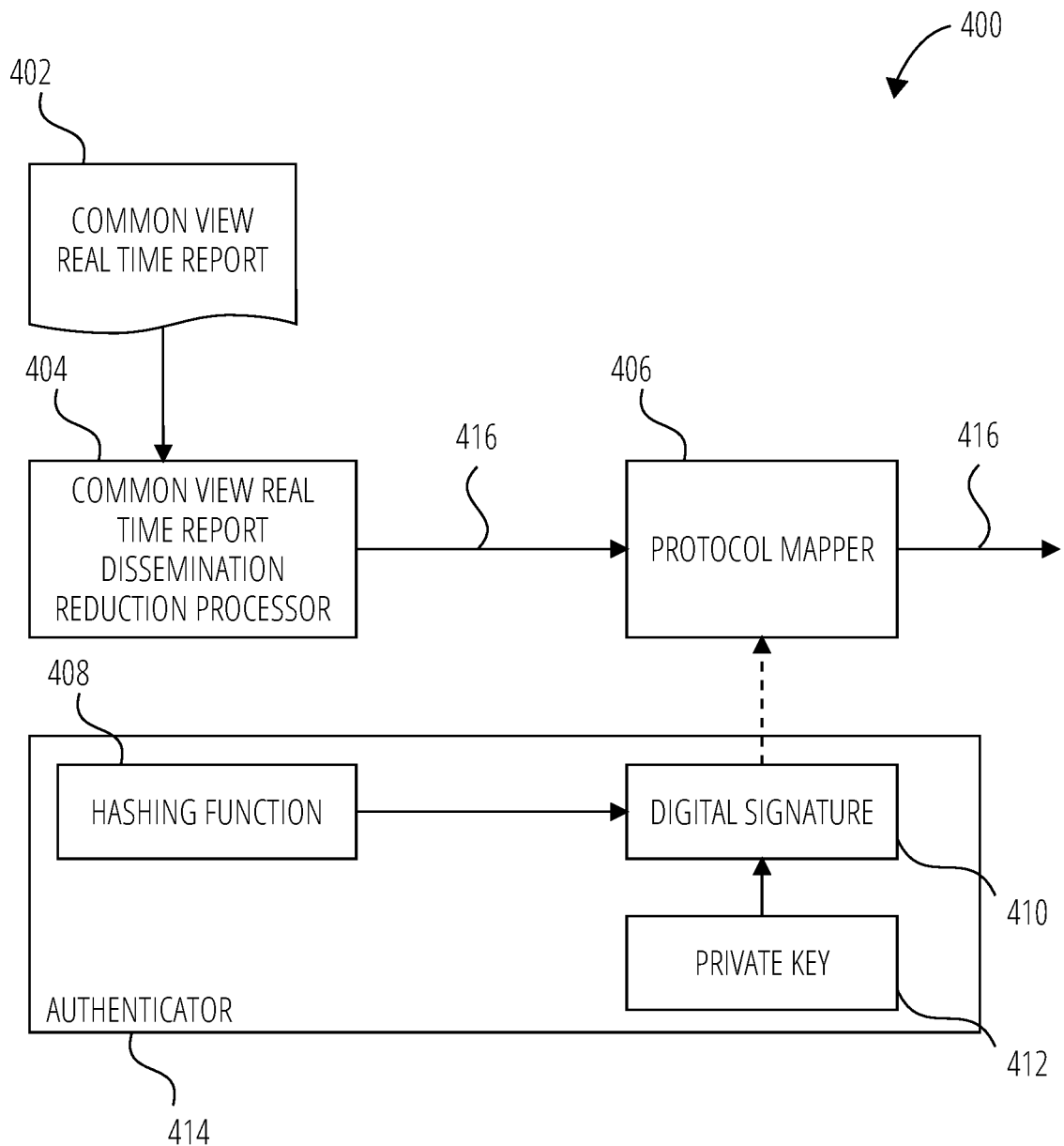
FIG. 4 is a block diagram of an example of a common view real time report disseminator of FIG. 1.

FIG. 4 is a block diagram of a common view real time report disseminator 400, which is an example of the common view real time report disseminator 108 of FIG. 1. The common view real time report disseminator 400 may include, as an input, a common view real time report 402, which may be an example of the reduced common view real time report 116 of FIG. 1, the common view real time report 118 of FIG. 1, or the common view real time report 230 of FIG. 2.

The common view real time report disseminator 400 also includes a common view real time report dissemination reduction processor 404 and a protocol mapper 406, each of which may be a function performed by processors 224, or by common view real time report disseminator 400. The common view real time report dissemination reduction processor 404 may act on the common view real time report 402 to generate a reduced common view real time report 416, which is an example of the reduced common view real time report 116 of FIG. 1. Reducing the amount of information in the reduced common view real time report 416 as compared to that of the common view real time report 402 may reduce the amount of processing performed by one or more processors (e.g., the processors 224 of FIG. 2), which may increase processing speed, simplify the implementation, and/or increase scalability. By way of non-limiting example, the common view real time report dissemination reduction processor 404 may reduce a number of report entries of the reduced common view real time report 416 relative to those of the common view real time report 402.

The protocol mapper 406 may map the reduced common view real time report 416 to a communication protocol that is supported for communication between an authoritative time system implementing the common view real time report dissemination reduction processor 404 (e.g., the authoritative time system 102 of FIG. 1) and a client time system (e.g., the client time system 104) that receives the reduced common view real time report 416.

The common view real time report disseminator 400 may also include authenticator 414, which may include a hashing function 408 and a private key 412 to generate a digital signature 410. The digital signature 410 may be provided to the protocol mapper 406 to add the digital signature 410 to the reduced common view real time report 416 so that a client time system receiving the reduced common view real time report 416 may authenticate the reduced common view real time report 416 as coming from an authoritative time system (e.g., the authoritative time system 102 of FIG. 1).

Figure 5:
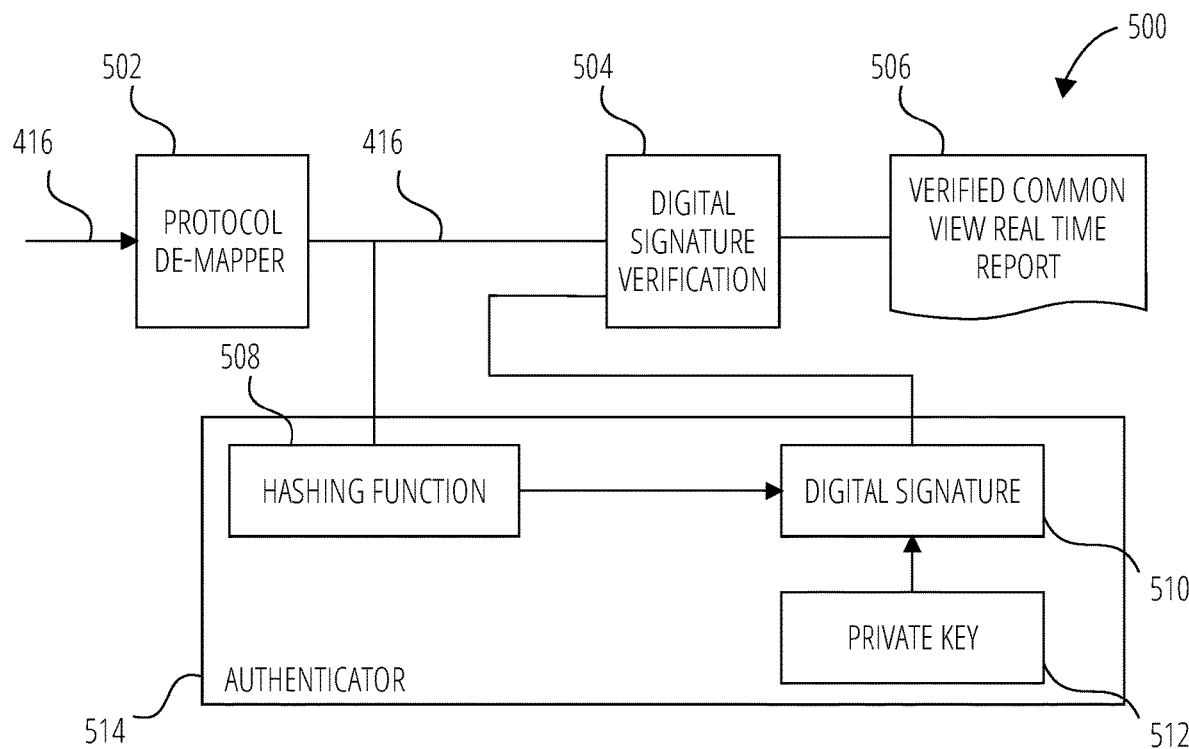
FIG. 5 is a block diagram of an example of a common view real time report receiver of FIG. 1.

FIG. 5 is a block diagram of a common view real time report receiver 500, which is an example of the common view real time report receiver 112 of FIG. 1. The common view real time report receiver 500 includes a protocol de-mapper 502, a digital signature verification logic 504, and authenticator 514, each of which may be respective operations performed by common view real time report receiver 500. The protocol de-mapper 502 de-maps the reduced common view real time report 416 received from an authoritative time system (e.g., from the common view real time report disseminator 400 of FIG. 4 of an authoritative time system such as the authoritative time system 102 of FIG. 1). The protocol de-mapper 502 delivers the reduced common view real time report 416, once de-mapped from the communication protocol, to a hashing function 508 of the authenticator 514 and to the digital signature verification logic operation 504.

The authenticator 514 include the hashing function 508 and a private key 512, which may be the same as the hashing function 408 and the private key 412 of FIG. 4. As a result, responsive to the digital signature 410 added to the reduced common view real time report 416 in the common view real time report disseminator 400 (FIG. 4), the authenticator 514 should produce a digital signature 510 that is the same as the digital signature 410 delivered to the common view real time report receiver 500 by the reduced common view real time report 416. The authenticator 514 provides the digital signature 510 to the digital signature verification logic 504.

The digital signature verification logic 504 receives the digital signature 510 and the reduced common view real time report 416, which includes the digital signature 410. The digital signature verification logic 504 verifies that the digital signature 410 and the digital signature 510 are the same to authenticate that the reduced common view real time report 416 was received from an authoritative time system (e.g., the authoritative time system 102 of FIG. 1) that is authorized to provide the reduced common view real time report 416. Responsive to verification of the digital signature 410 of the reduced common view real time report 416, the digital signature verification logic 504 provides a verified common view real time report 506, which may be delivered to a common view real time-transfer calculator 114 of a client time system 104 (FIG. 1).

Figure 6:
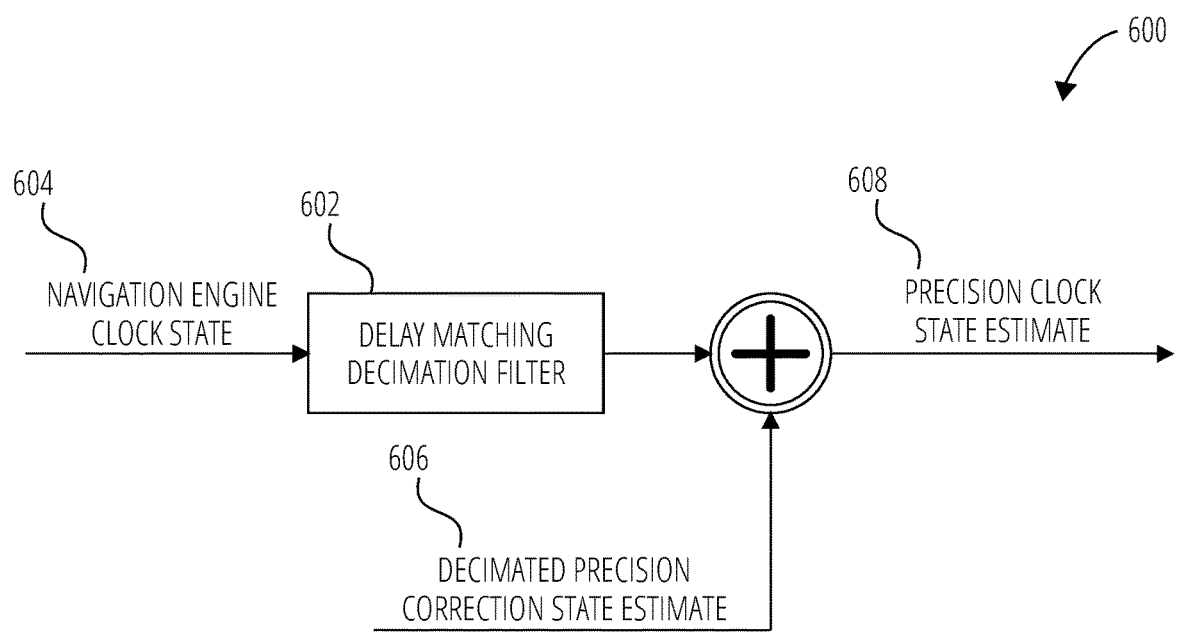
FIG. 6 is a block diagram of an example of a precision clock state pre-processor of FIG. 2.

FIG. 6 is a block diagram of a precision clock state pre-processor 600, which is an example of the precision clock state pre-processor 212 of FIG. 2. Inputs to the precision clock state pre-processor 600 include a navigation engine clock state 604, which is an example of the navigation engine clock state 216 provided by the receiver 204 of FIG. 2, and a decimated precision correction state estimate 606, which is an example of the decimated precision correction state estimate 218 provided by the event time tagging pre-processor 210 of FIG. 2.

In the common view real time efficient report generator of FIG. 2, the event time tagging pre-processor 210 may introduce some delay into the decimated precision correction state estimate 218 as compared to the navigation engine clock state 216 (FIG. 2). Accordingly, the decimated precision correction state estimate 606 may be delayed as compared to the navigation engine clock state 604 (e.g., because the time tagger of the event time tagging pre-processor 210 (FIG. 2) may be noisy). To correct for this delay, the precision clock state pre-processor 600 may include a delay matching decimation filter 602 to delay the navigation engine clock state 604 by substantially the same amount as the delay of the decimated precision correction state estimate 606 relative to the navigation engine clock state 604 to align, in time, the navigation engine clock state 604 with the decimated precision correction state estimate 606. The delay matching decimation filter 602 ensures that the navigation engine clock state 604 is delayed correlating with the decimated precision correction state estimate 606. The precision clock state pre-processor 600 uses the delayed version of the navigation engine clock state 604 and the decimated precision correction state estimate 606 to generate a precision clock state estimate 608 (e.g., a decimated precision clock state estimate), which is an example of the precision navigation clock state 220 of FIG. 2. By applying a precision clock correction, as shown in FIG. 6, the common receiver oscillator time error is cancelled out providing a precision clock state estimate. This precision clock state pre-processing effectively substitutes the precision local timescale as the reference for residual measurements.

Simply summing the precision clock state estimate with the per satellite signal pseudo range residuals 214 may be enhanced to specifically address reception in GNSS degraded environments. In contrast to using both careful antenna installation and sophisticated antennae to mitigate local RF environmental effects, a mass market application may include deployment of a lower-end GNSS antennae into less than ideal RF environments. These less than ideal RF environments may suffer from line of sight degradation, RF interference, or both, without limitation. Even if the receiver is stationary, the GNSS satellites (e.g., the one or more satellites 226 of FIG. 2) may move with respect to the stationary terrestrial receiver, which facilitates use of a line of sight finding algorithm as shown in FIG. 7.

Figure 7:
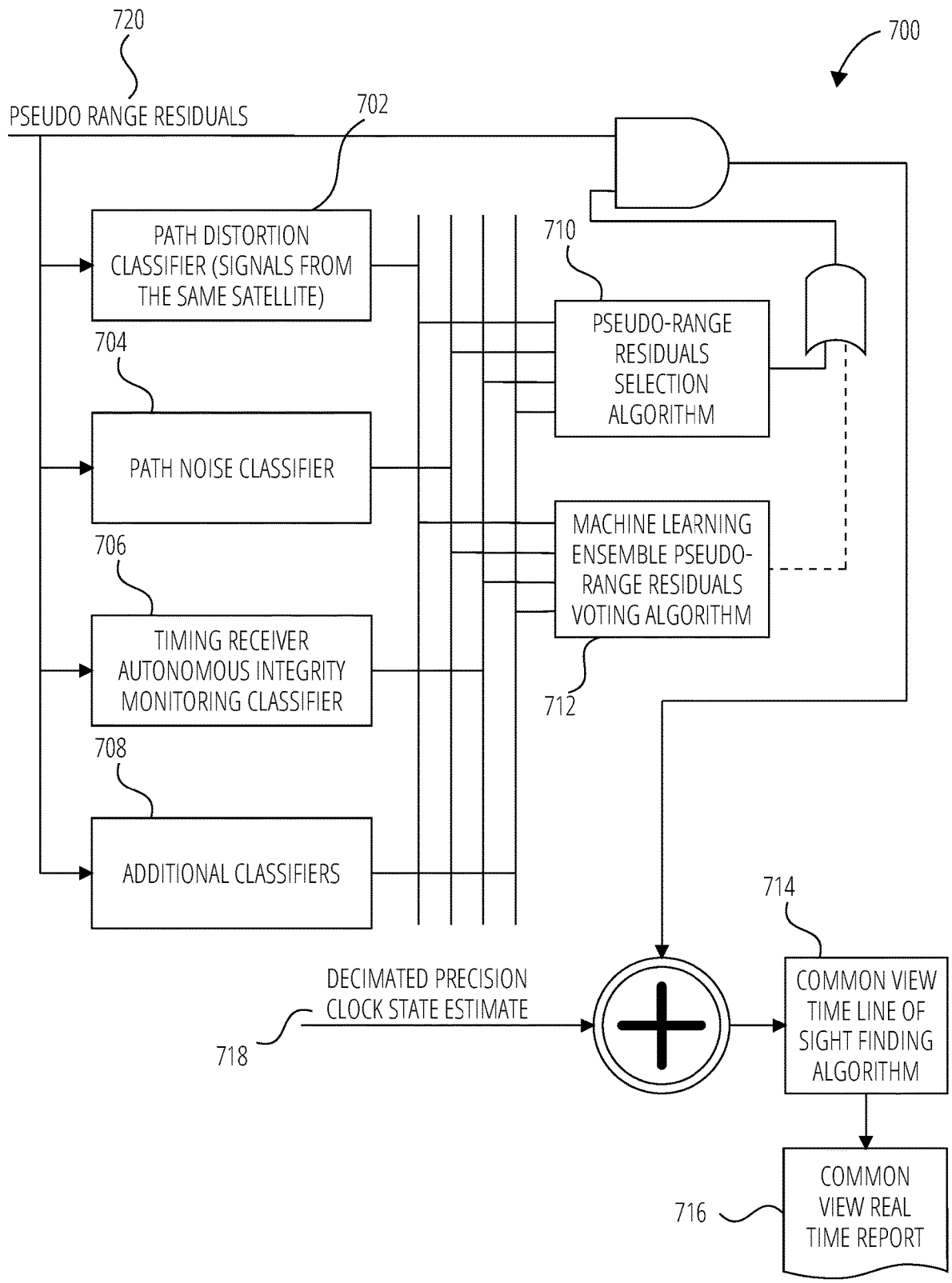
FIG. 7 is a block diagram of an example of a common view real time report updater of FIG. 2.

FIG. 7 is a block diagram of a common view real time report update generator 700, which is an example of the common view real time report update generator 206 of FIG. 2. Inputs to the common view real time report update generator 700 include pseudo range residuals 720, which is an example of the per satellite signal pseudo range residuals 214 of FIG. 2, and precision clock state estimate 718 (e.g., a decimated precision clock state estimate), which is an example of the precision navigation clock state 220 of FIG. 2 and the decimated precision correction state estimate 606 of FIG. 6.

Each entry (e.g., row) of the output common view real time report 716 is associated with a subset of the number of individual satellite signals as represented by the pseudo-range residuals 720, which are inputs to the common view real time report update generator 700. The subset of entries in the common view real time report 716 are based on validation based on both line of sight finding and outlier detection. The line of sight finding algorithm operates after the summing point as the reference clock is no longer the low end receive oscillator but rather the precision local timescale. Accordingly, after the summing point a pseudo-range with respect to a much more stable precision local timescale is observed, and as a result the window of observation may be extended by an order of magnitude to enhance detection of outliners. The stability performance of the precision local timescale permits sufficiently long observation windows in the line of sight algorithm to increase the population distribution of the observed time error so that the floor or "true line of sight" clock error can be estimated. Floor estimation algorithms are utilized in other timing processing and one reasonable skilled in the art utilize these algorithms in this application.

FIG. 7 illustrates rejection of anomalous pseudo range residuals 720 at least partially based on methods that complement the extended time window line of sight enhancement. The complemented line of sight finding validation is outlier detection. The rejection of anomalous pseudo range residuals 720 is at least partially based on the use of parallel anomaly classifiers (e.g., path distortion classifier 702, path noise classifier 704, timing receiver autonomous integrity monitoring classifier 706, additional classifiers 708, and combinations thereof). For example, the pseudo range residuals 720 are passed through a plurality of parallel anomaly classifiers (e.g., path distortion classifier 702, path noise classifier 704, timing receiver autonomous integrity monitoring classifier 706, and additional classifiers 708). The anomaly classifiers complement the line of sight finding as they do not depend on precision timescale. Leveraging multiple parallel anomaly detectors reduces false determinations to increase the available data and reduce timing uncertainty. The timing receiver autonomous integrity monitor classifier (TRAIM) is a well-established anomaly detection approach but may be susceptible to errors, especially in highly degraded reception environments. The path distorting detector (e.g., path distortion classifier 702) utilizes signals that are all from the same satellite to detect subtle anomalies associated with the path RF properties, in contrast to TRAIM. Since it is anticipated that two signals from the same satellite should be coherent within the expected small dispersion in the path this is a powerful detected to both intentional and unintentionally induced path error. A temperature classifier (not shown) may support avoiding residuals distorted by large thermal transients. Other detector classifiers may be added to the pre-processing beyond the ones specifically listed in FIG. 7.

Two approaches to utilizing the classifiers are illustrated in FIG. 7, including a pseudo-range residuals selection algorithm 710 and a machine learning ensemble pseudo-range residuals voting algorithm 712. In some examples, a pseudo-range residuals selection algorithm 710 may be used. This algorithm is a set of rules determined by expert analysis of test scenarios designed to mitigate local antenna GNSS degradation to acceptable levels. This may be preferred based on the existing extensive simulation and emulation tools available to achieve a commercial solution based on existing proven methods. The processing of the classifiers determines the subset of the satellite pseudo-range residuals 720 inputs that are valid and included as entries in the common view real time report 716.

An alternate is the use of a machine learning (e.g., machine learning ensemble pseudo-range residuals voting algorithm 712). The machine learning may include a voting algorithm at least partially based on the inputs of the classifiers and estimated time uncertainty of the solution. In this approach the selection rules may adapt over time to improve the overall solution at least partially based on the time uncertainty results.

The common view real time report update generator 700 takes the results of the pseudo-range residuals selection algorithm 710 and/or the machine learning ensemble pseudo-range residuals voting algorithm 712 to filter the pseudo range residuals 720, and uses the filtered pseudo range residuals 720 and the precision clock state estimate 718 in a common view time line of sight finding algorithm 714 to generate a common view real time report 716, which is the output of the update process. The common view real time report 716 includes an entry for each satellite signal successfully tracked for some portion of time within the temporal fusion time window. A temporal fusion window includes a start time and a duration that supports a tradeoff between common view data report size efficiency and time transfer error limit. It is essentially the duration of time that the nodes participating in time transfer can be considered quasi-static. Within a temporal fusion window, common view results that are valid can be paired together and considered as simultaneous measurements. Each temporal fusion time window is time tagged at the start of the temporal fusion time window with the current precision timescale. Signals that are tracked are classified by GNSS constellation, Space Vehicle, Frequency Band and Signal Type. Each entry includes estimate clock bias, clock drift and time uncertainty.

Although examples disclosed herein are agnostic to the actual protocol used for dissemination (e.g., FIG. 4) and receiving (e.g., FIG. 5) the report, two functions may be used. The first is the reduction procession prior to transmission. The reduction processing supports filters on constellations, frequency band, and signal type. Space Vehicles are filtered on elevation mask. In addition, entries that exceed a time uncertainty threshold are filtered. The second function is a verifiable, non-repudiated signature to ensure the client knows that the report content was not manipulated and that it was generated by the proper authoritative source.

The processing of the common view time transfer includes a common view real time-transfer calculator 114 illustrated in FIG. 1. Since the data integrity of both the local common view report and report provided by the authoritative system has been established in both the report generation and dissemination, these calculations may be analogous to existing methods in common view time transfer. In a pure common view calculation mode only matched pairs of signals from a common source available during the observation window are included. Alternatively, the time-transfer calculation can be based in an all-in view approach where there is no requirement for signal matching. The output of the calculator is the current best estimate of the time difference between the authoritative time source and the local precision timescale.

Figure 8:
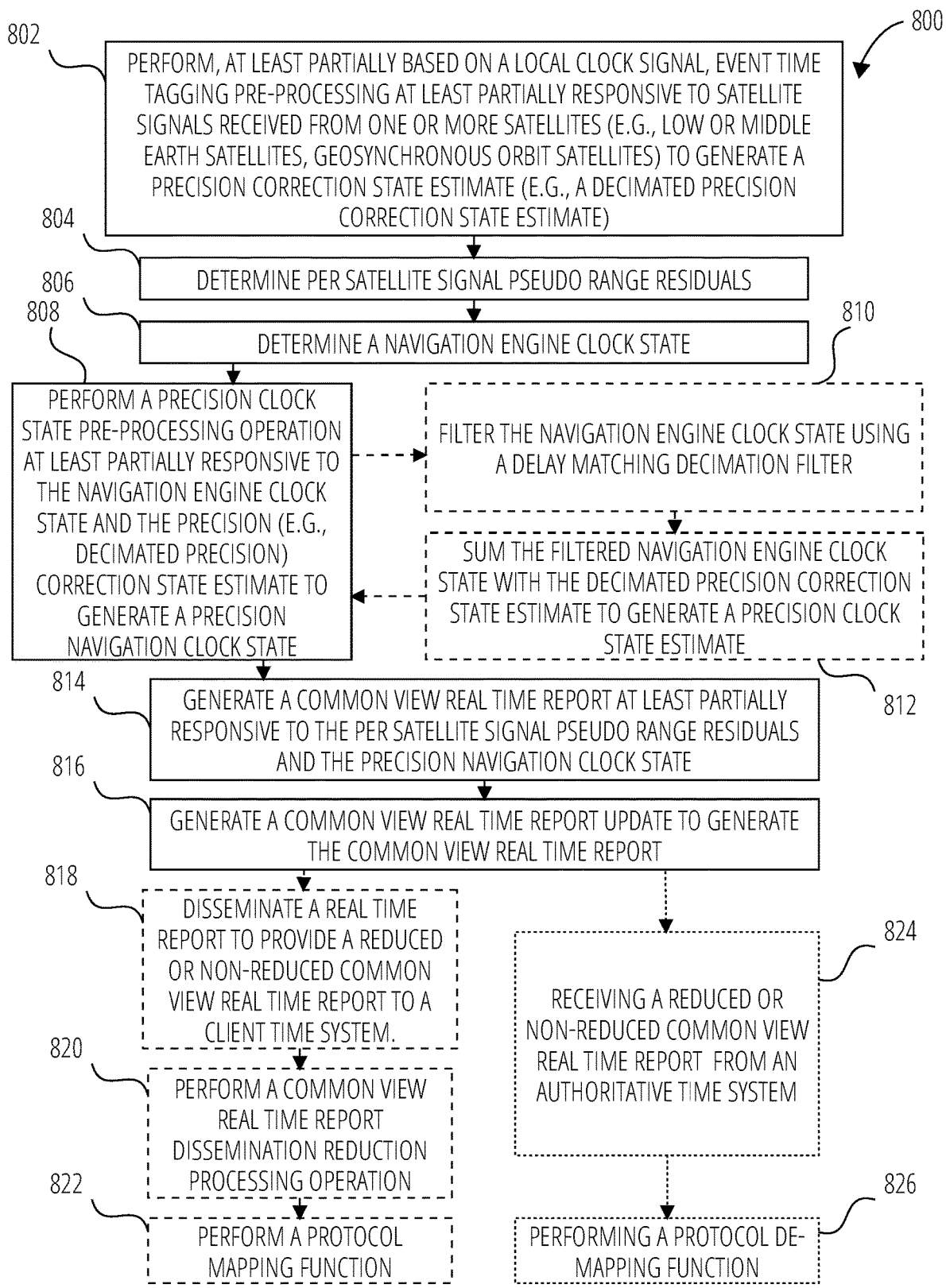
FIG. 8 is a flowchart illustrating a method, according to various examples.

FIG. 8 is a flowchart illustrating a method 800, according to various examples. At operation 802, the method 800 includes performing, at least partially based on a local clock signal, event time tagging pre-processing at least partially responsive to satellite signals received from one or more satellites to generate a precision correction state estimate. In some examples the precision correction state estimate may be at a reduced rate, i.e., it may be a decimated precision correction state estimate. In some examples performing event time tagging pre-processing at least partially responsive to satellite signals (e.g., the satellite signals 228 of FIG. 2) received from one or more satellites (e.g., the one or more satellites 226 of FIG. 2) comprises performing the event time tagging pre-processing at least partially responsive to low or middle earth orbit satellite signals received from one or more low or middle earth orbit satellites. In some examples performing event time tagging pre-processing at least partially responsive to satellite signals received from one or more satellites comprises performing the event time tagging pre-processing at least partially responsive to geosynchronous earth orbit satellite signals received from one or more geosynchronous earth orbit satellites.

At operation 804 the method 800 includes determining per satellite signal pseudo range residuals. At operation 806 the method 800 includes determining a navigation engine clock state.

At operation 808 the method 800 includes performing a precision clock state pre-processing operation at least partially responsive to the navigation engine clock state and the precision (e.g., decimated precision) correction state estimate to generate a precision navigation clock state (e.g., a decimated precision clock state). In some examples performing the precision clock state pre-processing operation includes filtering the navigation engine clock state using a delay matching decimation filter at operation 810. In some examples performing the precision clock state pre-processing operation includes summing the filtered navigation engine clock state with the precision correction state estimate to generate a precision clock state estimate (e.g., a decimated precision clock state estimate) at operation 812.

At operation 814 the method 800 includes generating a common view real time report at least partially responsive to the per satellite signal pseudo range residuals and the precision navigation clock state. At operation 816 the method 800 includes generating a common view real time report update to generate the common view real time report. In some examples performing the common view real time report update operation includes detecting anomalies relevant to the common view real time report using a plurality of parallel anomaly classifiers (e.g., see FIG. 7).

In examples where the method 800 is performed by an authoritative time system (e.g., the authoritative time system 102 of FIG. 1) the method 800 may include, at operation 818, disseminating a real time report to provide a reduced or non-reduced common view real time report (e.g., the reduced common view real time report 116 of FIG. 1, the common view real time report 120 of FIG. 1, the reduced common view real time report 416 of FIG. 4) to a client time system (e.g., the client time system 104 of FIG. 1). In some examples, at operation 820 the method 800 may include performing a common view real time report dissemination reduction processing operation (e.g., the common view real time report dissemination reduction processor 404 of FIG. 4). Also, at operation 822 the method 800 may include performing a protocol mapping function (e.g., the protocol mapper 406 of FIG. 4).

In examples where the method 800 is performed by a client time system (e.g., the client time system 104 of FIG. 1) the method 800 may include, at operation 824, receiving a reduced or non-reduced common view real time report from an authoritative time system (e.g., the authoritative time system 102 of FIG. 1). In such examples, at operation 826 the method 800 may include performing a protocol de-mapping function.

Figure 9:
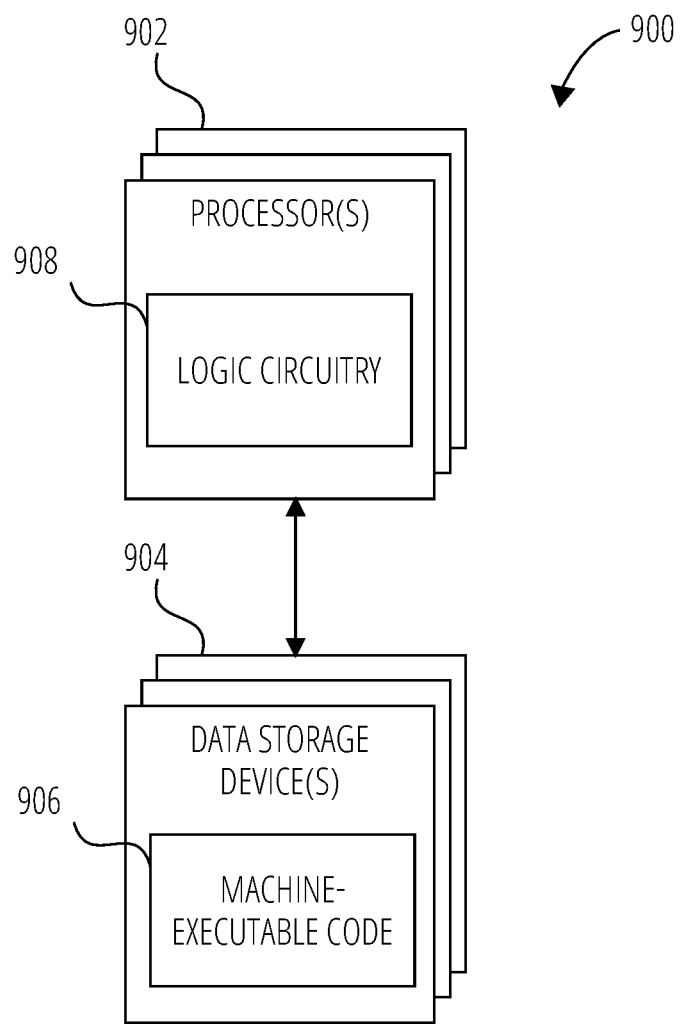
FIG. 9 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 9 illustrates non-limiting examples of implementations of functional elements disclosed herein. In some examples, some or all portions of the functional elements disclosed herein may be performed by hardware specially prepared for carrying out the functional elements.

FIG. 9 is a block diagram of circuitry 900 that, in some examples, may be used to implement various functions, operations, acts, processes, and/or methods disclosed herein. The circuitry 900 includes one or more processors 902 (sometimes referred to herein as "processors 902") operably coupled to one or more data storage devices (sometimes referred to herein as "storage 904"). The storage 904 includes machine-executable code 906 stored thereon and the processors 902 include logic circuitry 908. The machine-executable code 906 includes information describing functional elements that may be implemented by (e.g., performed by) the logic circuitry 908. The logic circuitry 908 is adapted to implement (e.g., perform) the functional elements described by the machine-executable code 906. The circuitry 900, when executing the functional elements described by the machine-executable code 906, should be considered as special purpose hardware for carrying out functional elements disclosed herein. In some examples the processors 902 may perform the functional elements described by the machine-executable code 906 sequentially, concurrently (e.g., on one or more different hardware platforms), or in one or more parallel process streams.

When implemented by logic circuitry 908 of the processors 902, the machine-executable code 906 is programmed to adapt the processors 902 to perform operations of examples disclosed herein. For example, the machine-executable code 906 may be programmed to adapt the processors 902 to perform at least a portion or a totality of the operations discussed for the common view real time efficient report generator 106, the common view real time report disseminator 108, the common view real time efficient report generator 110, the common view real time report receiver 112, and/or the common view real time-transfer calculator 114 of FIG. 1; the common view real time efficient report generator 200 of FIG. 2; the common view real time report disseminator 400 of FIG. 4; the common view real time report receiver 500 of FIG. 5; the precision clock state pre-processor 600 of FIG. 6; the common view real time report update generator 700 of FIG. 7; and/or the method 800 of FIG. 8.

The processors 902 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is programmed to execute functional elements corresponding to the machine-executable code 906 (e.g., software code, firmware code, hardware descriptions) related to examples of the present disclosure. It is noted that a general-purpose processor (may also be referred to herein as a host processor or simply a host) may be a microprocessor, but in the alternative, the processors 902 may include any conventional processor, controller, microcontroller, or state machine. The processors 902 may also be implemented as a combination of computing devices, such as a combination of a DSP and a microprocessor, a plurality of microprocessors, one or more microprocessors in conjunction with a DSP core, or any other such configuration.

In some examples the storage 904 includes volatile data storage (e.g., random-access memory (RAM)), non-volatile data storage (e.g., Flash memory, a hard disc drive, a solid state drive, erasable programmable read-only memory (EPROM), etc.). In some examples the processors 902 and the storage 904 may be implemented into a single device (e.g., a semiconductor device product, a system on chip (SOC), etc.). In some examples the processors 902 and the storage 904 may be implemented into separate devices.

In some examples the machine-executable code 906 may include computer-readable instructions (e.g., software code, firmware code). By way of non-limiting example, the computer-readable instructions may be stored by the storage 904, accessed directly by the processors 902, and executed by the processors 902 using at least the logic circuitry 908. Also by way of non-limiting example, the computer-readable instructions may be stored on the storage 904, transferred to a memory device (not shown) for execution, and executed by the processors 902 using at least the logic circuitry 908. Accordingly, in some examples the logic circuitry 908 includes electrically configurable logic circuitry 908.

In some examples the machine-executable code 906 may describe hardware (e.g., circuitry) to be implemented in the logic circuitry 908 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System-Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 906 may include an HDL, an RTL, a GL description, a mask level description, other hardware description, or any combination thereof.

In examples where the machine-executable code 906 includes a hardware description (at any level of abstraction), a system (not shown, but including the storage 904) may implement the hardware description described by the machine-executable code 906. By way of non-limiting example, the processors 902 may include a programmable logic device (e.g., an FPGA or a PLC) and the logic circuitry 908 may be electrically controlled to implement circuitry corresponding to the hardware description into the logic circuitry 908. Also by way of non-limiting example, the logic circuitry 908 may include hard-wired logic manufactured by a manufacturing system (not shown, but including the storage 904) according to the hardware description of the machine-executable code 906.

Regardless of whether the machine-executable code 906 includes computer-readable instructions or a hardware description, the logic circuitry 908 is adapted to perform the functional elements described by the machine-executable code 906 when implementing the functional elements of the machine-executable code 906. It is noted that although a hardware description may not directly describe functional elements, a hardware description indirectly describes functional elements that the hardware elements described by the hardware description are capable of performing.

EXAMPLES

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Example 1: An apparatus, comprising: a timing source; and one or more processors to: obtain a precision correction state estimate; obtain per satellite signal pseudo range residuals; obtain a navigation engine clock state; generate a precision navigation clock state at least partially responsive to the navigation engine clock state and the precision correction state estimate; and generate a common view real time report at least partially responsive to the per satellite signal pseudo range residuals and the precision navigation clock state.

Example 2: The apparatus of Example 1, wherein: the apparatus is an authoritative time system; and the one or more processors are to implement a real time report disseminator to provide the common view real time report or a reduced common view real time report to a client time system.

Example 3: The apparatus of Example 2, wherein the real time report disseminator includes a common view real time report dissemination reduction processor and a protocol mapper.

Example 4: The apparatus of Example 1, wherein: the apparatus is a client time system; and the one or more processors are to perform a common view real time report reception operation on a common view real time report or a reduced common view real time report received from an authoritative time system.

Example 5: The apparatus of Example 4, wherein the common view real time report reception operation includes a protocol de-mapper.

Example 6: The apparatus according to any one of Examples 1-5, wherein the precision clock state pre-processing operation includes a delay matching decimation filter to filter the navigation engine clock state.

Example 7: The apparatus of Example 6, wherein the one or more processors are to, as part of the precision clock state pre-processing operation, sum the filtered navigation engine clock state with the decimated precision correction state estimate to generate the precision clock state estimate.

Example 8: The apparatus according to any one of Examples 1-7, wherein the one or more processors are to implement a common view real time report update generator to generate the common view real time report.

Example 9: The apparatus of Example 8, wherein the common view real time report update generator includes a plurality of parallel anomaly classifiers to detect anomalies relevant to the common view real time report.

Example 10: The apparatus according to any one of Examples 1-9, wherein the apparatus includes a global navigational satellite system (GNSS) receiver.

Example 11: A method, comprising: performing event time tagging pre-processing at least partially responsive to satellite signals received from one or more satellites to generate a precision correction state estimate; determining per satellite signal pseudo range residuals; determining a navigation engine clock state; performing a precision clock state pre-processing operation at least partially responsive to the navigation engine clock state and the precision correction state estimate to generate a precision navigation clock state; and generating a common view real time report at least partially responsive to the per satellite signal pseudo range residuals and the precision navigation clock state.

Example 12: The method of Example 11, comprising disseminating a real time report dissemination operation to provide the common view real time report to a client time system.

Example 13: The method of Example 12, wherein disseminating the real time report includes: performing a common view real time report dissemination reduction processing operation; and performing a protocol mapping function.

Example 14: The method of Example 11, comprising receiving a common view real time report or a reduced common view real time report from an authoritative time system.

Example 15: The method of Example 14, wherein receiving the common view real time report or the reduced common view real time report includes performing a protocol de-mapping function.

Example 16: The method according to any one of Examples 11-15, wherein performing the precision clock state pre-processing operation includes filtering the navigation engine clock state using a delay matching decimation filter.

Example 17: The method of Example 16, wherein performing the precision clock state pre-processing operation includes summing the filtered navigation engine clock state with the decimated precision correction state estimate to generate the precision clock state estimate.

Example 18: The method according to any one of Examples 11-17, comprising generating a common view real time report update to generate the common view real time report.

Example 19: The method of Example 18, wherein generating the common view real time report update includes detecting anomalies relevant to the common view real time report using a plurality of parallel anomaly classifiers.

Example 20: The method according to any one of Examples 11-19, wherein performing the event time tagging pre-processing at least partially responsive to satellite signals received from one or more satellites comprises performing the event time tagging pre-processing at least partially responsive to middle earth orbit satellite signals received from one or more middle earth orbit satellites.

Example 21: A global navigational satellite system (GNSS) receiver, comprising: a receiver oscillator configured to provide a local clock signal; and one or more processors configured to: perform, at least partially based on the local clock signal, event time tagging pre-processing at least partially responsive to satellite signals received from one or more satellites to generate a decimated precision correction state estimate; determine per satellite signal pseudo range residuals; determine a navigation engine clock state; perform a precision clock state pre-processing operation at least partially responsive to the navigation engine clock state and the decimated precision correction state estimate to generate a decimated precision navigation clock state; and generate a common view real time report at least partially responsive to the per satellite signal pseudo range residuals and the decimated precision navigation clock state.

Example 22: The GNSS receiver of Example 21, wherein: the GNSS receiver is an authoritative time system; and the one or more processors are configured to perform a real time report dissemination operation to provide the common view real time report to a client time system.

Example 23: The GNSS receiver of Example 22, wherein the real time report dissemination operation includes a common view real time report dissemination reduction processing operation and a protocol mapping function.

Example 24: The GNSS receiver of Example 21, wherein: the GNSS receiver is a client time system; and the one or more processors are configured to perform a common view real time report reception operation on an authoritative common view real time report received from an authoritative time system.

Example 25: The GNSS receiver of Example 24, wherein the common view real time report reception operation includes a protocol de-mapping function.

Example 26: The GNSS receiver according to any one of Examples 21-25, wherein the precision clock state pre-processing operation includes a delay matching decimation filter configured to filter the navigation engine clock state.

Example 27: The GNSS receiver of Example 26, wherein the one or more processors are configured to, as part of the precision clock state pre-processing operation, sum the filtered navigation engine clock state with the decimated precision correction state estimate to generate the decimated precision clock state estimate.

Example 28: The GNSS receiver according to any one of Examples 21-27, wherein the one or more processors are configured to perform a common view real time report update operation to generate the common view real time report.

Example 29: The GNSS receiver of Example 28, wherein the common view real time report update operation includes a plurality of parallel anomaly classifiers configured to detect anomalies relevant to the common view real time report.

CONCLUSION

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
a timing source; and
one or more processors to:
obtain a precision correction state estimate;
obtain per satellite signal pseudo range residuals;
obtain a navigation engine clock state;
generate a precision navigation clock state at least partially responsive to the precision correction state estimate and the navigation engine clock state; and
generate a common view real time report at least partially responsive to the per satellite signal pseudo range residuals and the precision navigation clock state.

2. The apparatus of claim 1, wherein the timing source comprises a receiver oscillator.

3. The apparatus of claim 1, wherein the one or more processors are to:
perform event time tagging pre-processing at least partially responsive to satellite signals to obtain the precision correction state estimate.

4. The apparatus of claim 1, wherein:
the apparatus is an authoritative time system; and
the one or more processors implement a real time report disseminator to provide the common view real time report or a reduced common view real time report to a client time system.

5. The apparatus of claim 4, wherein the real time report disseminator includes a common view real time report dissemination reduction processor and a protocol mapper.

6. The apparatus of claim 1, wherein:
the apparatus is a client time system; and
the one or more processors are to perform a common view real time report reception operation on a common view real time report or a reduced common view real time report received from an authoritative time system.

7. The apparatus of claim 6, wherein the common view real time report reception operation includes a protocol de-mapper.

8. The apparatus of claim 1, wherein the one or more processors implement a common view real time report update generator to generate the common view real time report.

9. The apparatus of claim 1, wherein the one or more processors are to:
perform a precision clock state pre-processing operation to generate the precision navigation clock state.

10. The apparatus of claim 1, wherein the apparatus includes a global navigational satellite system (GNSS) receiver.

11. A method, comprising:
obtaining a precision correction state estimate;
obtaining per satellite signal pseudo range residuals;
obtaining a navigation engine clock state;
generating a precision navigation clock state at least partially responsive to the precision correction state estimate and the navigation engine clock state; and
generating a common view real time report at least partially responsive to the per satellite signal pseudo range residuals and the precision navigation clock state.

12. The method of claim 11, comprising:
performing event time tagging pre-processing at least partially responsive to satellite signals to obtain the precision correction state estimate.

13. The method of claim 11, comprising:
disseminating a real time report dissemination operation to provide the common view real time report to a client time system.

14. The method of claim 13, wherein disseminating the real time report dissemination operation comprises:
performing a common view real time report dissemination reduction processing operation; and
performing a protocol mapping function.

15. The method of claim 11, comprising:
receiving the common view real time report or a reduced common view real time report from an authoritative time system.

16. The method of claim 11, wherein generating the precision navigation clock state comprises:
performing a precision clock state pre-processing operation at least partially responsive to the precision correction state estimate and the navigation engine clock state, including filtering the navigation engine clock state using a delay matching decimation filter.

17. The method of claim 11, which is performed by at least one of an authoritative time system or a client time system.

18. Computer-readable media having machine-executable code stored thereon, the machine-executable code to adapt one or more processors to perform operations including obtaining a precision correction state estimate; obtaining per satellite signal pseudo range residuals; obtaining a navigation engine clock state; generating a precision navigation clock state at least partially responsive to the precision correction state estimate and the navigation engine clock state; and generating a common view real time report at least partially responsive to the per satellite signal pseudo range residuals and the precision navigation clock state.

19. The computer-readable media of claim 18, wherein the machine-executable code is to adapt the one or more processors to perform operations including performing event time tagging pre-processing at least partially responsive to satellite signals to generate a precision correction state estimate.

20. The computer-readable media of claim 18, wherein the machine-executable code is to adapt the one or more processors to perform operations including disseminating a real time report dissemination operation to provide the common view real time report to a client time system.

21. The computer-readable media of claim 18, wherein the machine-executable code is to adapt the one or more processors to perform operations including receiving a common view real time report or a reduced common view real time report from an authoritative time system.

22. The computer-readable media of claim 18, wherein the machine-executable code is to adapt the one or more processors to perform operations including event time tagging pre-processing at least partially responsive to satellite signals received from one or more satellites to generate the precision correction state estimate.

\* \* \* \* \*